May 14, 1929.　　　F. H. GLEASON ET AL　　　1,712,882
HYDRAULIC BRAKE CYLINDER
Filed June 3, 1924　　　2 Sheets-Sheet 2
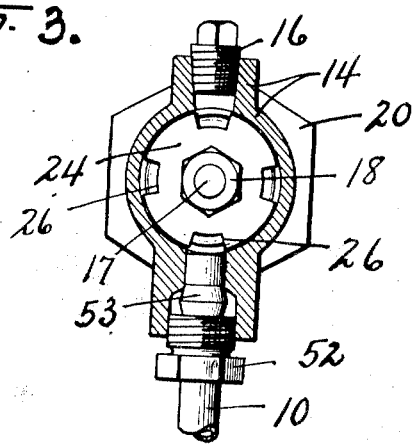
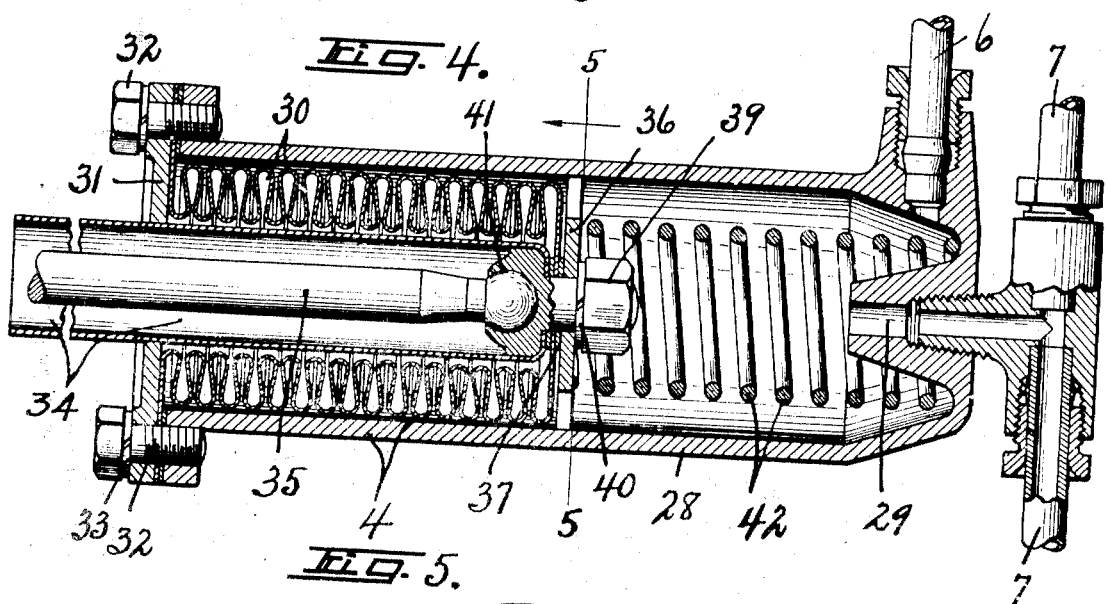
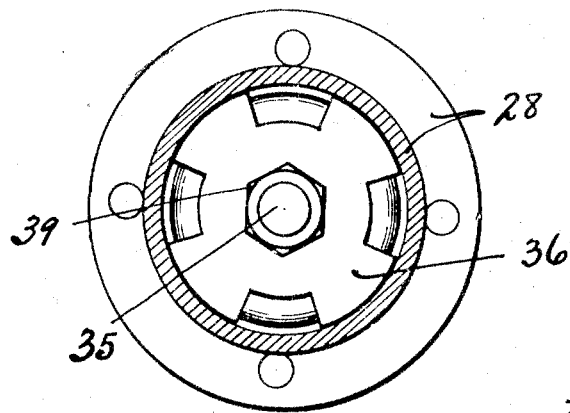

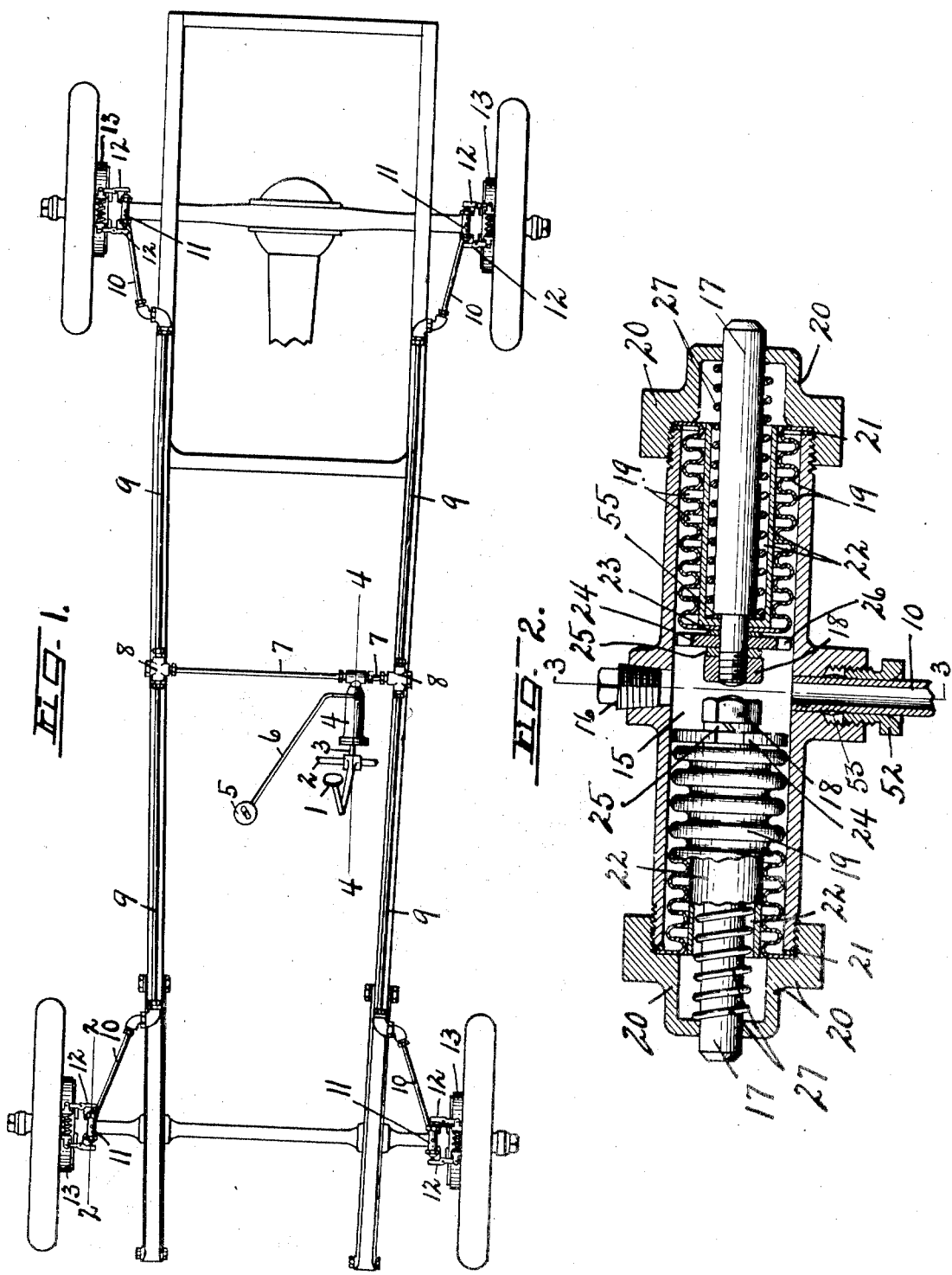

Patented May 14, 1929.

1,712,882

UNITED STATES PATENT OFFICE.

FREDERICK H. GLEASON, OF AUBURN, NEW YORK, AND LELAND F. GOODSPEED, OF KALAMAZOO, MICHIGAN, ASSIGNORS TO BOWEN PRODUCTS CORPORATION, OF AUBURN, NEW YORK, A CORPORATION OF NEW YORK.

HYDRAULIC BRAKE CYLINDER.

Application filed June 3, 1924. Serial No. 717,590.

This invention relates to certain new and improved hydraulic cylinders for use with hydraulic brakes or other devices controlled by fluid hydraulic pressure. The hydraulic control system as used for applying the brakes of an automobile chassis requires a master-operating hydraulic cylinder and four brake-applying hydraulic cylinders with double opposed pistons to transmit the hydraulic pressure to the brake bands or shoes on the brake drums with which the vehicle wheels are equipped. The travel of the brake pedal which operates the master hydraulic cylinder, which in turn operates the brake-applying hydraulic cylinders is limited by the distance the operator's foot can conveniently travel, coupled with the pressure per square inch required on the fluid to properly apply the pressure necessary to apply the brake through the brake applying hydraulic cylinders located near the brake-drums on the vehicle wheels. A very small leak in the packings of either the master hydraulic cylinder or the brake-applying hydraulic cylinders will render the system inoperative because the brake pedal will reach the limit of its travel, and the pressure on the fluid in the cylinders and connecting tubes will be lost.

The object of this invention is to eliminate such difficulty by means of an improved construction of hydraulic cylinder in which packings are eliminated and leakage prevented.

Other objects and advantages relate to the details of the structure all as will more fully appear from the following description, taken in connection with the accompanying drawings, in which:

Figure 1 is a top plan view of a hydraulic braking system applied to an automobile chassis.

Figure 2 is a section on line 2—2, Figure 1.
Figure 3 is a section on line 3—3, Figure 2.
Figure 4 is a section on line 4—4, Figure 1.
Figure 5 is a section on line 5—5, Figure 4.

In a general way, the known hydraulic brake system comprises a brake-pedal —1— in the form of a bell crank, preferably mounted in any suitable manner as upon the shaft —2—, and having its lower end connected to the piston rod —3— which actuates the piston in the master cylinder —4—. The master cylinder —4— and the remaining portions of the hydraulic system are maintained full of fluid taken from a small reservoir —5— connected to the master cylinder —4— by a tube —6— so that the reservoir supplies a small amount of fluid to the system each time the foot pedal is operated if the system is not entirely filled with fluid. From the master cylinder, two supply supply lines —7—extend to the tubing T —8— at opposite sides of the frame of the vehicle and from the T —8— tubes —9— extend to the flexible tubes —10— connected to the respective brake-applying cylinders —11— located on the outer ends of the axles of the chassis.

The construction above described is well known and used with present hydraulic braking systems.

The invention here resides particularly in the construction of the master operating cylinder —4— and the brake-applying cylinders —11—, both of which constructions involve similar features of structure and operation.

The brake-applying cylinders —11— as best shown in Figure 2, have double opposed means for operating the brake rocker levers —12— which are attached to brake bands —13— on the brake drums of the wheels.

The tube —10— is attached to the casing —14— of the brake-applying cylinders —12— by means of a tubing nut —52— and tubing sleeve —53— of ordinary construction. The casing —14— is provided with a cylindrical bore —15— extending from end to end thereof and with a pipe plug —16— at its upper part to permit all air or gas to be forced out of the tubes and passages.

In effect the casing —14— constitutes two cylinders including duplicate brake-operating mechanisms and a description of one of such brake-operating cylinders will serve to describe both.

As illustrated, a round shaft —17— is provided with a reduced diameter at one end and threaded to receive a nut —18—. A convoluted collapsible diaphragm or bellows —19— has its open end clamped to one of the open ends of the casing —14— and for this purpose the base of the bellows —19— is flanged outwardly and clamped between one end of the cylinder —14— and a threaded nut —20— which also acts as a guide for shaft —17— and through the central portion of which the shaft —17— projects outwardly, and the joint between the flanged portion of the diaphragm or bellows and the casing —14— and nut —20— may be made fluid-tight in any suitable manner, as by gasket —21—.

The reduced end portion of shaft —17— extends through the otherwise closed end of a cylindrical steel shell —22— and through the otherwise closed end of bellows —19— through the washer —23—, guide disk —24—, lock washer —25—, and the nut —18— is threaded upon the reduced end of the shaft so as to clamp the parts named between the shoulder on the shaft at the base of the reduced portion and the nut.

The joint between the parts is made fluid-tight by means of the washer or gasket —23— and an additional washer or gasket —55— positioned between the partially closed ends of the steel shell —22— and the shoulder upon the shaft —17—.

Preferably in expanded position, as illustrated, the bellows is of slightly less diameter than the interior diameter of the casing —14— and the shell —22— is of somewhat less diameter than the internal diameter of the bellows —19— to permit unobstructed contracting or compressing of the bellows or convoluted diaphragm —19—.

The circular guiding disk —24— has a loose sliding fit in the cylinder or casing —14— and is provided with edge slots —26— to permit the fluid to freely pass therethrough.

A spring —27— surrounding the shaft —17— normally maintains the shaft —17— at its inner position when there is no pressure on the fluid in the cylindrical bore of the casing —14—.

The construction of the moving means in the master hydraulic cylinder —4— is substantially the same as that described in connection with the operating mechanism in the casing or cylinder —14— except that the mechanism is of a unitary rather than duplicate character. The structure of the master cylinder, as best shown in Figure 4, comprises a casing or cylinder —28— having a passageway —29— at one end in communication with the supply lines —7—. Within the cylinder —28— is arranged a bellows or convoluted diaphragm —30— having its base outwardly flanged and clamped between the base of the cylinder and a cap plate —31—, suitable gaskets being interposed for maintaining the joint fluid-tight. The cap may be connected to the cylinder in any suitable manner, as by bolts —32— equipped if desired with lock-washers —33—. Within the bellows is arranged a steel tube —34— normally projecting at one end a distance equal to the travel of the piston rod closed at one end except for an opening through which the jointed shaft or rod —35— extends and the shaft may, as shown, be provided with a shoulder which contacts with the inner wall of the partially closed end of the tube —34—, a suitable gasket being interposed, if desired. The shaft then extends through the otherwise closed end of the bellows or diaphragm —30— and through a guiding disk —36— having a peripheral recess or recesses, suitable washers or gaskets —37— being interposed for rendering the joint fluid-tight. The end wall of the steel tube, the end wall of the bellows and the guiding disk are clamped tightly against the shoulder on the shaft —35— by means of a nut —39— and lock washer —40—. The jointed shaft is preferably of a character in which the two parts are connected by a ball and socket joint —41—. A spring —42— is interposed between the front end of the cylinder —28— and the front surface of the guiding disk —36— so as to normally maintain the convoluted diaphragm or bellows —30— in contracted or compressed condition, thereby maintaining the foot pedal —1— in an operative position so that the brakes can be applied.

The operation of these hydraulic cylinders is as follows:

When the foot pedal —1— is depressed, the bellows —30— in the master cylinder —28— is expanded, forcing the fluid from the master cylinder through tubes 7, —9— and —10— to the cylindrical bore of the casing —14—. The fluid pressure acting equally in all directions in the casing —14— compresses the bellows and forces both of the shafts —17— outwardly, thereby contracting the brake bands —13— on the brake drums through the medium of the rocking levers —12—. The cylindrical steel shell —22— supports the convoluted diaphragm —19— and prevents the fluid pressure in the bore of casing —14— from collapsing the diaphragm. When the fluid pressure is relieved by releasing foot pedal —1—, spring —42— returns the diaphragm —30— to its contracted position, thereby releasing the pressure in the supply lines and permitting springs —27— to return shafts —17—, the bellows and the brake-operating parts connected with them to starting position, and the brakes are thereby released.

This construction of hydraulic cylinder provides a means for utilizing hydraulic fluid pressure with the elimination of packings and the like, thereby eliminating leakage and escape of the operating fluid.

Altho we have shown and described specific constructions as illustrative of perhaps preferred embodiments of our invention, we do not desire to restrict ourselves to the details of the structure, as various changes may be made within the scope of the appended claims.

We claim:

1. A hydraulic mechanism and braking apparatus to be actuated thereby, said mechanism comprising a casing, a pair of convolute cup-shape diaphragms reversely arranged within the casing with their open ends disposed outwardly and secured to the casing in a fluid-tight manner, shafts secured to the closed ends of the respective cup-shape diaphragms and moving with the diaphragms as they expand and contract for actuating said apparatus reversely, and means for supplying fluid under pressure to said casing between said diaphragms for simultaneously actuating the latter.

2. A hydraulic cylinder comprising a substantially cylindrical casing, a bellows arranged within the casing with its open end clamped to the open end of the casing, a shaft having a fluid-tight engagement with the closed end of the bellows, and a tube within and of slightly less diameter than the bellows, and carried by said shaft.

3. A hydraulic cylinder comprising a substantially cylindrical casing, a bellows arranged within the casing with its open end clamped to the open end of the casing, a shaft having a fluid-tight engagement with and extending through the closed end of the bellows, and a peripherally recessed guide disk mounted on the shaft in front of the closed end of the bellows and guiding the bellows in its movement within the casing.

4. A hydraulic cylinder comprising a substantially cylindrical casing, a bellows arranged within the casing with its open end clamped to the open end of the casing, a shaft having a fluid-tight engagement with the closed end of the bellows, a tube within and of slightly less diameter than the bellows, and a guide disk mounted on the shaft in front of the closed end of the bellows and guiding the bellows in its movement within the casing.

5. A hydraulic cylinder comprising a substantially cylindrical casing, a bellows arranged within the casing with its open end clamped to the open end of the casing, a shaft having a fluid-tight engagement with the closed end of the bellows, and a tube within and of slightly less diameter than the bellows and carried by said shaft, and a guide disk mounted on the shaft forward of the bellows and having an opening therethrough for the passage of fluid and adapted to guide the bellows in its movement within the casing.

6. A hydraulic cylinder comprising a substantially cylindrical casing, a bellows arranged within the casing with its open end clamped to the open end of the casing, a shaft having a fluid-tight engagement with the closed end of the bellows, a tube within and of slightly less diameter than the bellows and carried by said shaft, and spring means within the tube for normally maintaining the bellows in extended position.

7. A hydraulic cylinder comprising a substantially cylindrical casing, a bellows arranged within the casing with its open end clamped to the open end of the casing, a shaft having a fluid-tight engagement with and extending through the closed end of the bellows, a peripherally recessed guide disk mounted on the shaft in front of the closed end of the bellows and guiding the bellows in its movement within the casing, and spring means for normally maintaining the bellows in extended position.

8. A hydraulic cylinder comprising a substantially cylindrical casing, a bellows arranged within the casing with its open end clamped to the open end of the casing, a shaft having a fluid-tight engagement with the closed end of the bellows, a tube within and of slightly less diameter than the bellows, a guide disk mounted on the shaft in front of the closed end of the bellows and guiding the bellows in its movement within the casing, and spring means within the tube for normally maintaining the bellows in extended position.

9. A hydraulic cylinder comprising a substantially cylindrical casing, a bellows arranged within the casing with its open end clamped to the open end of the casing, a shaft having a fluid-tight engagement with the closed end of the bellows, a tube within and of slightly less diameter than the bellows and carried by said shaft, a guide disk mounted on the shaft forward of the bellows and having an opening therethrough for the passage of fluid and adapted to guide the bellows in its movement within the casing, and spring means within the tube for normally maintaining the bellows in extended position.

10. A hydraulic cylinder comprising an elongated casing, opposed bellows arranged within the casing with their open ends disposed outwardly and secured to the casing in a fluid tight manner, shafts secured to the closed ends of respective bellows and moving with the bellows as they expand and contract, and means for admitting fluid into the casing.

11. A hydraulic cylinder comprising an elongated casing, opposed bellows arranged within the casing with their open ends disposed outwardly and secured to the casing in a fluid-tight manner, shafts secured to the closed ends of respective bellows and moving with the bellows as they expand and contract, and means for admitting fluid within the casing at a point between the closed ends of the bellows.

12. A hydraulic cylinder comprising an elongated casing, opposed bellows arranged within the casing with their open ends disposed outwardly and secured to the casing in a fluid-tight manner, shafts secured to the closed ends of respective bellows and moving with the bellows as they expand and contract, means for admitting fluid into the casing, and spring means for normally maintaining the bellows in extended position.

13. A hydraulic cylinder comprising an elongated casing, opposed bellows arranged within the casing with their open ends disposed outwardly and secured to the casing in a fluid-tight manner, shafts secured to the respective bellows and moving with the bellows, means for admitting fluid into the casing, spring means for normally maintaining the bellows in extended position, and means for interiorly supporting the bellows during their movement.

14. A hydraulic mechanism and braking apparatus to be actuated thereby, said mechanism comprising a casing, a pair of convolute cup-shape diaphragms reversely arranged within the casing with their open ends disposed outwardly and secured to the casing in a fluid-tight manner, shafts secured to the closed ends of the respective cup-shape diaphragms and moving with the diaphragms as they expand and contract for actuating said apparatus reversely, means for supplying liquid under pressure to said casing between said diaphragms for simultaneously actuating the latter, and spring means for normally maintaining the cup-shape diaphragms in extended position.

15. A hydraulic cylinder comprising a cylindrical casing, a convoluted cup-shaped diaphragm arranged within the casing, a tube arranged within the diaphragm, a rod extending through the tube and the inner end of the diaphragm and secured thereto in a fluid-tight manner, and spring means exerting pressure upon the diaphragm.

In witness whereof we have hereunto set our hands this 14th day of May 1924.

FREDERICK H. GLEASON.
LELAND F. GOODSPEED.